(12) United States Patent
Scott et al.

(10) Patent No.: US 8,037,421 B2
(45) Date of Patent: Oct. 11, 2011

(54) SYSTEM AND METHOD FOR ORGANIZING APPLICATION INDICATORS ON AN ELECTRONIC DEVICE

(75) Inventors: Sherryl Lee Lorraine Scott, Toronto (CA); Gary P. Mousseau, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 302 days.

(21) Appl. No.: 11/246,534

(22) Filed: Oct. 11, 2005

(65) Prior Publication Data

US 2007/0083827 A1   Apr. 12, 2007

(51) Int. Cl.
*G06F 3/048* (2006.01)
(52) U.S. Cl. .................................. 715/811; 715/864
(58) Field of Classification Search .................. 715/866, 715/864, 811, 789, 788
See application file for complete search history.

(56) References Cited

U.S. PATENT DOCUMENTS

| | | | |
|---|---|---|---|
| 5,396,264 A | 3/1995 | Falcone et al. | |
| 5,497,455 A * | 3/1996 | Suga et al. | 715/835 |
| 5,673,405 A | 9/1997 | Tange | |
| 5,691,744 A * | 11/1997 | Anstotz et al. | 715/745 |
| 5,740,390 A | 4/1998 | Pickover et al. | |
| 5,796,394 A | 8/1998 | Wicks et al. | |
| 6,253,218 B1 * | 6/2001 | Aoki et al. | 715/526 |
| 7,137,075 B2 * | 11/2006 | Hoshino et al. | 715/848 |
| 7,231,229 B1 * | 6/2007 | Hawkins et al. | 455/564 |
| 7,454,713 B2 * | 11/2008 | Spalink et al. | 715/828 |
| 7,543,244 B2 * | 6/2009 | Matthews et al. | 715/811 |
| 2002/0160817 A1 * | 10/2002 | Salmimaa et al. | 455/566 |
| 2003/0098892 A1 * | 5/2003 | Hiipakka | 345/846 |
| 2004/0036779 A1 * | 2/2004 | Cazier et al. | 348/231.2 |
| 2004/0043758 A1 * | 3/2004 | Sorvari et al. | 455/414.1 |
| 2005/0044508 A1 * | 2/2005 | Stockton | 715/811 |
| 2005/0251755 A1 * | 11/2005 | Mullins et al. | 715/779 |
| 2006/0253794 A1 * | 11/2006 | Wilson | 715/779 |

FOREIGN PATENT DOCUMENTS

WO   WO 02/10892 A2   2/2002
WO   WO 02/089342 A1   11/2002

* cited by examiner

*Primary Examiner* — Boris Pesin
*Assistant Examiner* — Omar Abdul-Ali

(57) ABSTRACT

A device for and a method of dynamically refreshing presentation of icons for objects processed on an electronic device are provided. The method comprises: establishing a triggering event to initiate refreshment of a layout of the icons displayed on a display in the device; upon detection of the triggering event, creating a ranking of the objects processed by the device utilizing activity logs providing their recent levels of activity; identifying a most frequently processed object from the ranking; and automatically refreshing the layout of icons to highlight an icon associated with the most frequently processed object. The device incorporates modules to perform the method.

18 Claims, 9 Drawing Sheets

| | |
|---|---|
| Enterprise Activation | ○ |
| Messages | ● |
| Address Book | ○ |
| Calendar | ○ |
| Applications | ○ |
| Profiles (Normal) | ○ |

Fig. 6D

SYSTEM AND METHOD FOR ORGANIZING APPLICATION INDICATORS ON AN ELECTRONIC DEVICE

FIELD OF THE INVENTION

The invention described herein relates to a system and method for organizing displayed application indicators, including icons and/or text, for applications operating on an electronic device. In particular, the invention described herein relates to using information, such as activity data for an application, to identify more frequently used applications and to highlight icons associated with those applications.

BACKGROUND OF THE INVENTION

The world has grown accustomed to mobile telephonic devices (MTD) such as cell phones and phone-based Personal Digital Assistants (PDAs). These devices function in a wireless network where one or more such devices communicate using voice or data to each other or to external services. Services can include making external phone calls to land-line voice networks, making phone calls to other cell phones, leaving or retrieving voice mail message or exchanging data messages, such as e-mails, text messages, pages and others.

As such devices become more predominant in usage, it is common for there to be a vast number of messages received by the device. For example, if a device is configured to receive a copy of all email messages from a user's main email account, then the device can be a central repository for all email messages, short message service (SMS) messages, instant messaging (IM) messages, voice mail messages and other communications. Prior art graphical user interfaces (GUIs) on such devices provide limited customization of displayed icons and text for the applications, e.g. the size of the icons can be changed. While icons can be manually moved to specific location in the display, the basic layout and appearance of the icons are static until further changes are made by the user to the GUI. There is no ability to dynamically or automatically control the layout or appearance of the icons.

There is a need to address deficiencies in the prior art.

BRIEF DESCRIPTION OF THE DRAWINGS

The invention will now be described, by way of example only, with reference to the accompanying drawings, in which:

FIG. 6D is a representation of an image generated on the display of the device of FIG. 1 illustrating yet another arrangement of icons (as text only) produced after the execution of the flow chart of FIG. 5.

DETAILED DESCRIPTION OF AN EMBODIMENT

Figure 1:
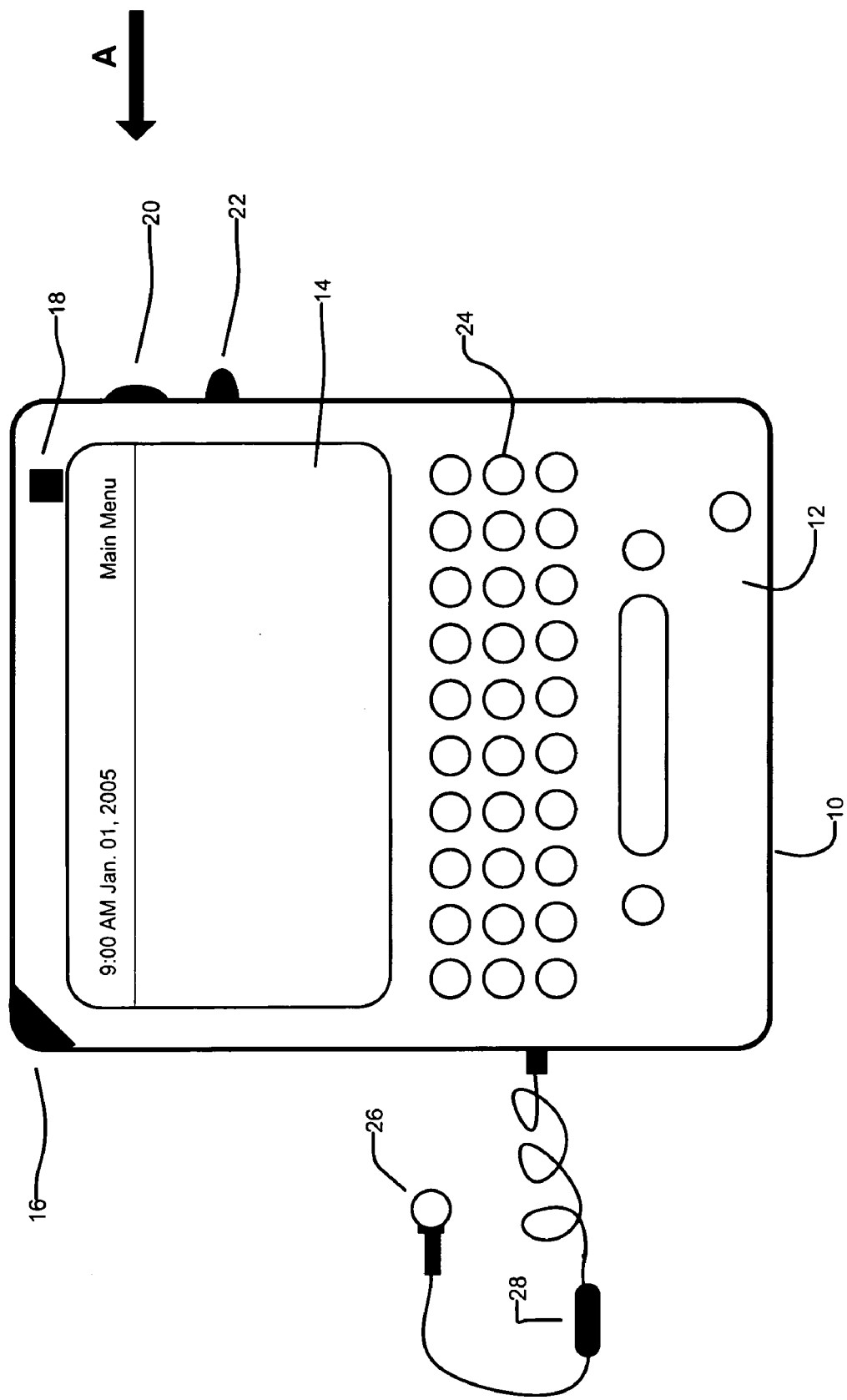
FIG. 1 is a schematic representation of an electronic device having a display in accordance with an embodiment.

The description which follows, and the embodiments described therein are provided by way of illustration of examples of particular embodiments of the principles of the present invention. These examples are provided for the purposes of explanation and not limitation of those principles and of the invention. In the description which follows, like parts are marked throughout the specification and the drawings with the same respective reference numerals.

In a first aspect, a method of dynamically refreshing presentation of icons for objects stored on an electronic device is provided. An icon displayed on a display of the device represents an object processed by the device. An icon can contain graphics, text, or a combination of both. An object can be an application, a file, a folder, a data structure or any other information stored, controlled or processed by the device. The method comprises: establishing a triggering event to initiate refreshment of a layout of the icons displayed on a display in the device; upon detection of the triggering event, creating a ranking of the applications operating on the device utilizing activity logs providing their recent levels of activity; identifying a most frequently used application from the ranking; and automatically refreshing the layout of icons to highlight an icon associated with the most frequently processed object.

In the method, the applications may collectively receive and transmit communications with sources utilizing various communication technologies.

In the method, the ranking of the applications may utilize a subset of data in the activity logs.

In the method, the subset of data may exclude records older than a certain timestamp.

In the method, the subset of data may further exclude records originating from an unwanted source.

In the method, the refreshing the layout of icons may place the icon in a prominent location on the display.

In the method, the refreshing the layout of icons may further comprise placing a set icons associated with a set of next most frequently processed objects in next most prominent locations on the display.

In the method, the triggering event may be based on a time detected by the device. The time detected by the device may be the time of day and any associations made through appropriate software with events at particular times of day. For example, a certain time range may be associated with being "at home", "at work" or "commuting". Alternatively, the triggering event may be based on a determined location detected by the device.

In the method, the refreshing the layout of icons may emphasize visual aspects of the icon over other icons shown on the display.

In a second aspect, a communication device for processing communications received and transmitted over communication technologies is provided. The device comprises: a display; a communication system to transmit and receive the communications; at least one application to update activity logs associated with the communications processed by the device; and another application. This application has several functions, including: establishing a triggering event; detecting the triggering event; then upon detection, accessing the activity logs to generate a ranking of the communication technologies in order of recent levels of activity; identifying a most frequently used communication technology from the ranking; and automatically refreshing a layout of icons displayed on the display to highlight an icon associated with the most frequently used communication technology.

In the device, the ranking of the applications may utilize a subset of data in the activity logs. The subset of data may further exclude records older than a certain timestamp. The subset of data may still further exclude records originating from at least one unwanted source.

In the device, the layout of icons may be refreshed to place the icon in a prominent location on the display and to place a set icons associated with a set of next most frequently used communication technologies in next most prominent locations on the display.

In the device, the layout of icons may be refreshed to emphasize visual aspects of the icon over other icons shown on the display.

In other aspects various combinations of sets and subsets of the above aspects are provided.

Referring to FIG. 1, an electronic device for receiving electronic communications, in accordance with an embodiment of the invention is indicated generally at 10. In the present embodiment, electronic device 10 is based on a computing platform having functionality of an enhanced personal digital assistant with cellphone and e-mail features. It is, however, to be understood that electronic device 10 can be based on construction design and functionality of other electronic devices, such as smart telephones, desktop computers pagers or laptops having telephony equipment. In a present embodiment, electronic device 10 includes, a housing 12, which frames a LCD display 14, a speaker 16, an LED indicator 18, a trackwheel 20, an ESC ("escape") key 22, keypad 24 and a telephone headset comprised of an ear bud 26 and a microphone 28. Trackwheel 20 and ESC key 22 can be inwardly depressed along the path of arrow "A" as a means to provide additional user-input. It will be understood that housing 12 can be made from any suitable material as will occur to those of skill in the art. Device 10 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and the many forms of 802.11 wireless broadband, like 802.11a, 802.11b, 802.11g, etc. that can support voice. Other embodiments include Voice over IP (VoIP) type streaming data communications that can simulate circuit switched phone calls. Ear bud 26 can be used to listen to phone calls and other sound messages and microphone 28 can be used to speak into and input sound messages to device 10.

Figure 2:
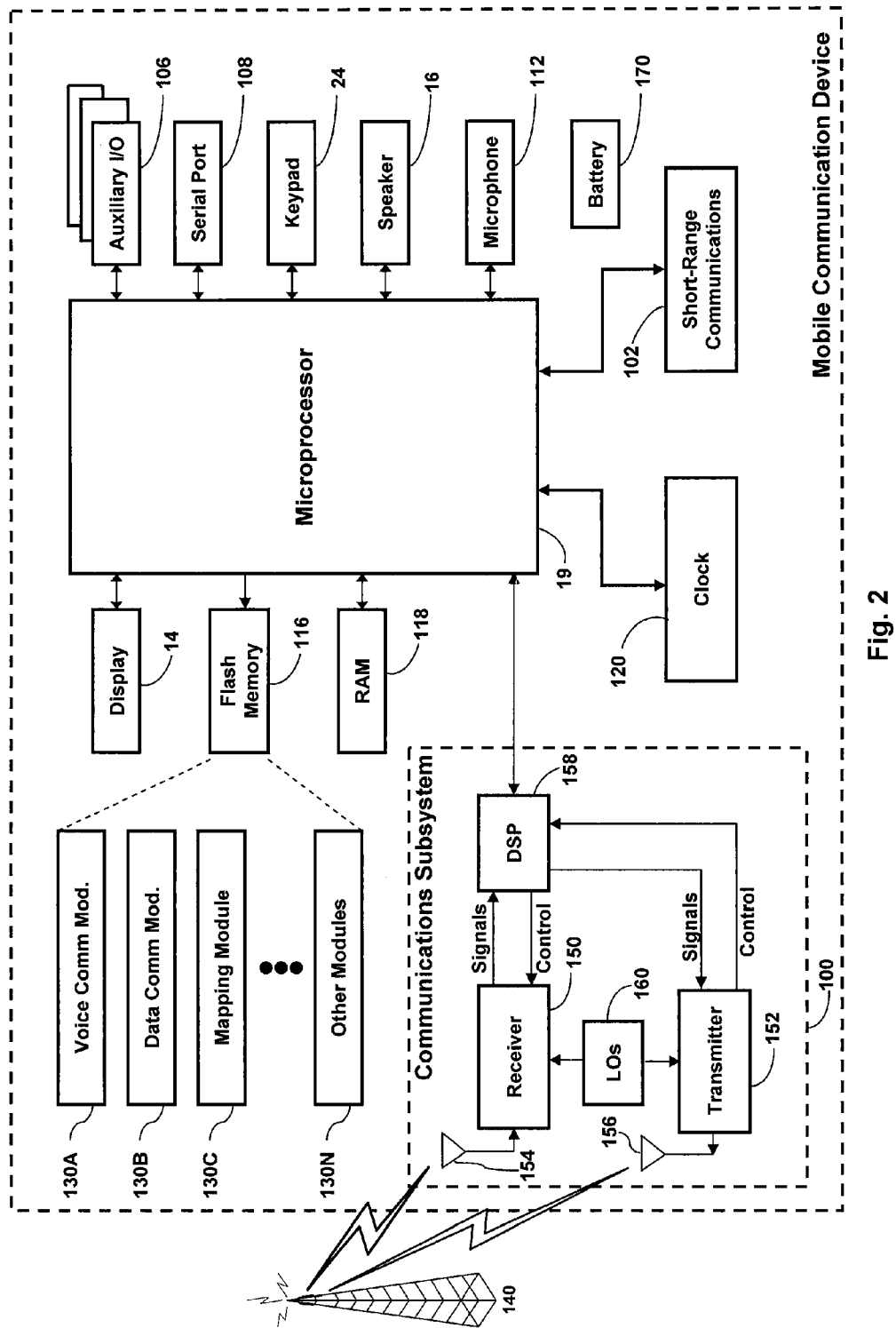
FIG. 2 is a block diagram of certain internal components within the device in FIG. 1.

Referring to FIG. 2, functional elements of device 10 are provided. The functional elements are generally electronic or electro-mechanical devices. In particular, microprocessor 19 is provided to control and receive almost all data, transmissions, inputs and outputs related to device 10. Microprocessor 19 is shown as coupled to keypad 24, display 14 and other internal devices. Microprocessor 19 controls the operation of the display 14, as well as the overall operation of the device 10, in response to actuation of keys on the keypad 24 by a user.

Exemplary microprocessors for microprocessor 19 include Data 950 (trade-mark) series microprocessors and the 6200 series microprocessors, all available from Intel Corporation.

In addition to the microprocessor 19, other internal devices of the device 10 are shown in FIG. 2. These include: a communication subsystem 100; a short-range communication subsystem 102; keypad 24; display 14; other input/output devices including a set of auxiliary I/O devices 106, a serial port 108, a speaker 16 and a microphone port 112 for microphone 28; as well as memory devices including a flash memory 116 (which provides persistent storage of data) and random access memory (RAM) 118; clock 120 and other device subsystems (not shown). The device 10 is preferably a two-way radio frequency (RF) communication device having voice and data communication capabilities. In addition, device 10 preferably has the capability to communicate with other computer systems via the Internet.

Operating system software executed by the microprocessor 19 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile store, such as RAM 118. Communication signals received by the mobile device may also be stored to RAM 118.

Microprocessor 18, in addition to its operating system functions, enables execution of software applications on device 10. A set of software applications 130 that control basic device operations, such as a voice communication module 130A and a data communication module 130B, may be installed on the device 10 during manufacture or downloaded thereafter. Cell mapping module 130C may also be installed on device 10 during manufacture. As well, additional software modules, illustrated as another software module 130N, which may be, for instance, a personal information manager (PIM) application, may be installed during manufacture or downloaded thereafter into device 10. PIM application is preferably capable of organizing and managing data items, such as e-mail messages, calendar events, voice mail messages, appointments, and task items. Data associated with each application can be stored in flash memory 116.

Communication functions, including data and voice communications, are performed through the communication subsystem 100 and the short-range communication subsystem 102. Collectively, subsystem 102 and subsystem 100 provide the signal-level interface for all communication technologies processed by device 10. Various applications 130 provide the operational controls to further process and log the communications. Communication subsystem 100 includes receiver 150, transmitter 152 and one or more antennas, illustrated as receive antenna 154 and transmit antenna 156. In addition, communication subsystem 100 also includes processing module, such as digital signal processor (DSP) 158 and local oscillators (LOs) 160. The specific design and implementation of communication subsystem 100 is dependent upon the communication network in which device 10 is intended to operate. For example, communication subsystem 100 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice (telephonic) networks, both separate and integrated, may also be utilized with device 10. In any event, communication subsystem 100 provides device 10 with the capability of communicating with other devices using various communication technologies, including IM systems, text messaging (TM) systems and SMS systems, which are specific types of text message systems.

In addition to processing communication signals, DSP 158 provides control of receiver 150 and transmitter 152. For example, gains applied to communication signals in receiver 150 and transmitter 152 may be adaptively controlled through automatic gain control algorithms implemented in DSP 158.

In a data communication mode, a received signal, such as a text message or web page download, is processed by the communication subsystem 100 and is provided as an input to microprocessor 19. The received signal is then further processed by microprocessor 19 which can then generate an output to the display 14 or to an auxiliary I/O device 106. A device user may also compose data items, such as e-mail messages, using keypad 24, a thumbwheel associated with keypad 24, and/or some other auxiliary I/O device 106, such as a touchpad, a rocker switch, a separate thumbwheel or some other input device. The composed data items may then be transmitted over communication network 140 via communication subsystem 100. Subsystem 100 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O subsystems, such as a voice message recording subsystem, may also be implemented on device 10. In addition, display 14 may also be utilized in voice communication mode, for example, to display the identity of a calling party, the duration of a voice call, or other voice call related information.

Short-range communication subsystem 102 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack. A power switch (not shown) provides an "on/off" switch for device 10. Upon activation of the power switch an application 130 is initiated to turn on device 10. Upon deactivation of the power switch, an application 130 is initiated to turn off device 10. Power to device 10 may also be controlled by other devices and by internal software applications, as described further below.

Figure 3:
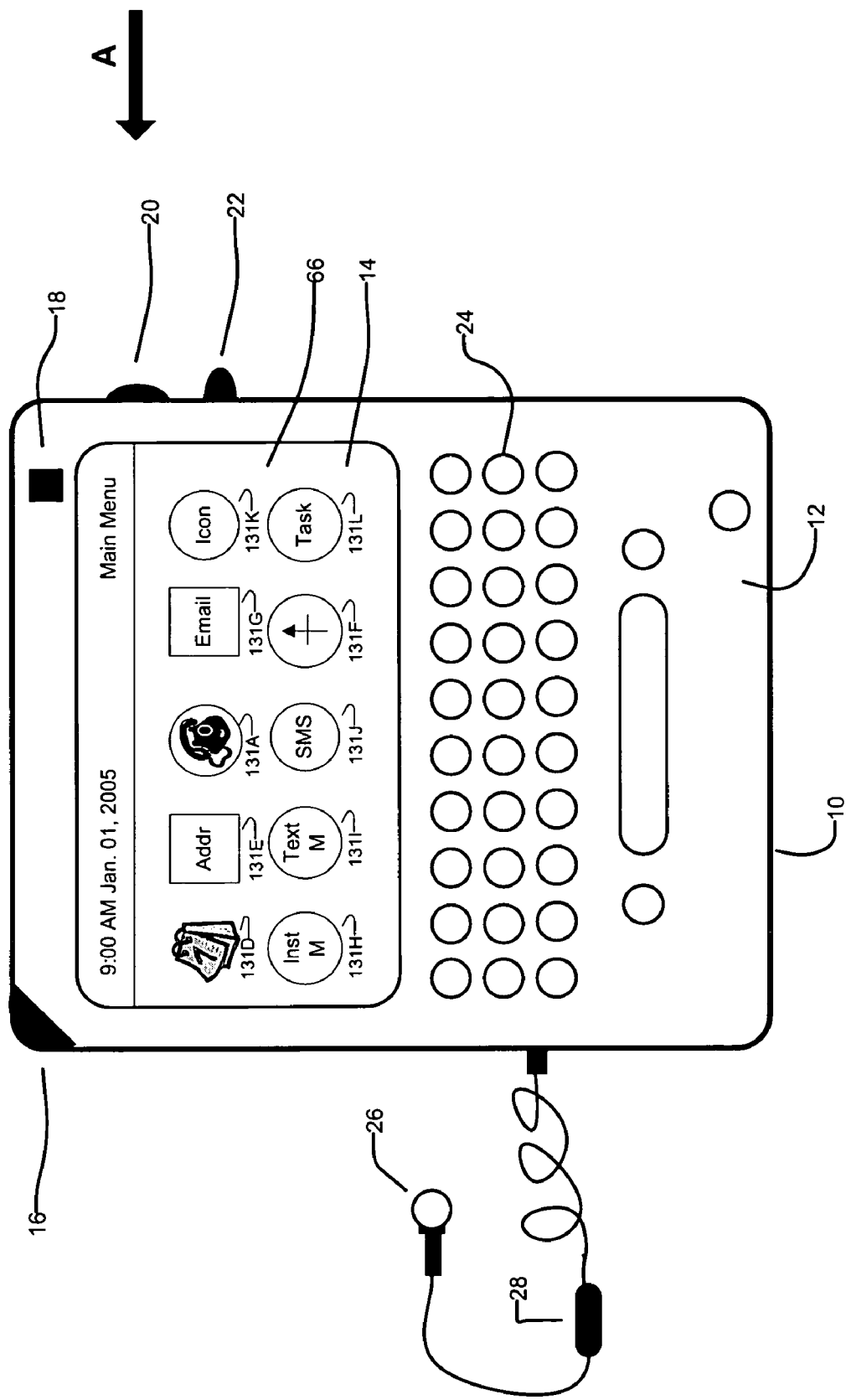
FIG. 3 is a schematic representation of the device of FIG. 1 with its display showing a plurality of applications including an address book, a calendar, an instant message module, a short message service module, a task list manager, and an icon manager.

Referring now to FIG. 3, device 10 is shown in operation where applications 130 stored therein are being executed. Applications generate and control aspects of main menu screen 66. Therein, system clock 68 is displayed providing time and date information which is updated according to internal clock 120. Main screen 66 has several applications presented thereon through separate icons 131, which individually represent separate applications 130. An icon is used to represent an application, file, folder or object stored or processed by the device. For the purposes of the description of an embodiment herein, the term "icon" refers to any of: graphics alone, text alone, or a combination of graphics and text, which represents an associated application, file, folder, etc., and the term "object" refers to any file, application, folder, dataset or information stored on device 10 which has an "icon" associated with it.

Using either specific keystrokes on keypad 24 or trackwheel 20, the icons can be sequentially highlighted and selected. In particular, to select and activate a particular application, once the icon is highlighted, it can be selected by clicking trackwheel 20 inwardly along the path of arrow A. ESC key 22 can be used to exit any application by pressing inwardly, along the path of arrow A, on ESC key 22. Generally, when no selected application is running in the "foreground" of device 10, (i.e. actively operating and generating its GUIs on the display after being explicitly activated by either the user or an internal command within device 10), then main menu screen 66 is generated on display 14. A brief description of functional aspects of selected applications is provided.

Calendar 130D (which is associated with icon 131D) tracks appointments and other status matters relating to the user and device 10. It provides a daily/weekly/month electronic schedule of appointments, meetings and events as entered by the user. Calendar 130D tracks time and day data for device 10 using processor 19 and internal clock 120. The schedule contains data relating to the current availability of the user. For example it can indicate when the user is busy, not busy, available or not available. The application can also provide a "do not disturb" window of time for a user. Effectively, calendar 130D allows device 10 to be set to not notify the user when an interrupt event occurs, in spite of any lack of scheduled appointments during that window. For example, if a telephone call is received in that window, the application can automatically route the call to voice mail without initiating the ring tone on device 10, and if an email is received, it is automatically stored, but no enunciation is generated. Once the time period for the window has passed, device 10 can then generate notifications (e.g. ring tones, buzz signals) on device 10 to alert the user of the previously received events. At that point, the user may then access the storage systems on device 10 to retrieve any stored particulars relating to the events.

In use, the user initiates calendar 130D which then generates input screens on device 10 that prompt the user to provide time, date and detail parameters for scheduled events. Typically the parameters are entered through keyboard 24. Alternatively, notification for scheduled events could be received via an encoded signal in a received communication, such as an e-mail, SMS message or voicemail message. Once the data relating to the event is entered, calendar 130D stores processes information relating to the event; generates data relating to the event; and stores the data in memory in device 10, preferably non-volatile memory flash 116. This data can be accessed by calendar 130D and other applications.

Address book 130E (which is associated with icon 131E) enables device 10 to store contact information for persons and organizations. In particular, name, address, telephone numbers, e-mail addresses, cellphone numbers and other contact information are stored in linked records. The data is stored in non-volatile memory, such as persistent storage 116 in device 10 in a database. In use, the database is organized such that individual contact information can be accessed and cross referenced to other data in the same or other applications.

Telephone application 130A (which is associated with icon 131A) provides an interface to allow the user of device 10 to initiate a telephone call on device 10. It also provides a GUI to store and list a record of telephone calls made, telephone calls received and voice-mail messages stored by device 10.

Email application 130G (which is associated with icon 131G) provides modules to allow user of device 10 to generate email messages on device 10 and send them to their addressees. Application 130G also provides a GUI which provides a historical list of emails received, drafted, saved and sent.

Icon manager 130K (which is associated with icon 131K) is an application which allows user of device 10 to define different views for main screen 66, depending on settings and priority information provided by the user to icon manager 130K. It is one type of PIM. Further detail on the operation of icon manager 130K is provided later.

IM application 130H (which is associated with icon 131H) provides modules to allow users to receive, generate, track and process instant messages. Messages are sent to and received from other parties identified by their telephone numbers. Application 130H also provides a GUI which provides a historical list of instant messages received, drafted, saved and sent.

TM application 130I (which is associated with icon 131I) provides modules to allow users to receive, generate, track and process text messages. Text messages are sent and received to and from recipients as identified by their telephone numbers. Application 130I also provides a GUI which provides a historical list of text messages received, drafted, saved and sent.

SMS application 130J (which is associated with icon 131J) provides modules to allow users to receive, generate, track and process SMS messages. Messages are sent and received to and from recipients as identified by their telephone numbers. Application 130J also provides a GUI which provides a historical list of SMS messages received, drafted, saved and sent.

Location module 130F (which is associated with icon 131F) provides the current geographic location of device 10. In one embodiment, it receives and interprets remote GPS signals from a system of satellites to triangulate the current location of device 10, using, for example GPS modules and applications known in the art. On device 10, a GPS interface application controls the storage of GPS data retrieved by location module 130F. Alternatively, location information may be determined by analyzing encoded data relating to cellular telephone calls executed on device 10. For example, the encoded data stream can be examined to identify the current base station to which device 10 is communicating.

In any event, once location module 130F has location information for the device, it provides graphical information in a map presented on display 14 showing the current location of device 10. As specific locations may have specific contexts for the user (e.g. home, office, cottage, parents' home, out of the city, etc.), GPS interface application allows associations to be made between specific locations or regions with appropriate text labels. The associations are stored in a database and can be accessed by all applications 130 as needed.

Task application 130L (which is associated with icon 131L) allows the user to track and enter memo notes with "to-do" items. It provides similar functionality to calendar 130D, but also allows for simple, text-only notes to be collected and tracked in a single application. In other embodiments, task application 130L may be incorporated into calendar application 130D and may generate timed reminders on the device 10 for the user.

It will be appreciated that the applications that process events or incoming and outgoing messages and files (e.g. calendar 130D, telephone 130A, email application 130G, IM application 130H, TM application 130I, SMS application 130J and task manager 130L) track events or messages through an activity log. Each application stores its activity log a non-volatile memory location, such as in memory 116.

One feature of an embodiment allows the icon layout of icons 131 on main screen 66 to be dynamically re-arranged to highlight icons of the more frequently used applications. As such, activity logs of emails, telephone calls, IMs and SMS messages applications may be automatically analyzed to rank applications in their order of recent message activity. The icons for the applications can then be re-arranged automatically to emphasize the icons of the applications having more actions recorded in their activity logs. Alternatively or additionally, specific icons associated with different objects may be visually highlighted or de-emphasized depending on their respective relative rankings of activity. For example, foreground colours, background colours and/or animation features may be added or changed for a particular icon depending on its level of activity. For example, if an application is frequently used, its immediate background colour may be changed to differ and stand out from the backgrounds of the other icons. Alternatively, the font, colour and animation attributes of a text description of an icon may be changed. It will be appreciated that fonts, colours and appearances may be changed to either enhance or de-emphasize an icon of an application, as appropriate.

An embodiment may provide further features. For example, filters may be defined and implemented to conduct the analysis at pre-defined times or when device 10 is determined to be at pre-defined locations. For example, when a user of device 10 is at home, he may wish device 10 to downgrade the importance of emails and upgrade the importance of telephone calls. As such, a filter can be defined to automatically re-arrange the telephone icon to be more prominently displayed than the email icon when device 10 is determined to be at "home" (using, for example data provided by location application 130F). This ranking can be set to be provided even if email application 130G has been used more often than telephone application 130A. As such, the user of device 10, when at home, can more quickly spot and activate the telephone application 130A from main screen 66.

To illustrate operation of an embodiment, reference is made to main screen 66, where the icons are presented thereon in an order to indicate the relative frequency of use of each application. For example, icons for applications which are more commonly used are provided at a prominent location in display 14. Applications which are less commonly used have their icons shown in a less prominent location. In some instances in order to reserve valuable space on display 14 for more frequently used applications, the icons of the least used applications may be removed from the display and accessed through a special menu option. For the provided layout on main screen 66, icons are shown in two rows. The more frequently used applications have their icons in the top row and the most frequently used application has its icon in the left most position in the top row. As shown, in the top row, calendar icon 131D, address book icon 131E, telephone icon 131A, email application icon 131G and icon manager icon 131K are shown. On a bottom row, IM application icon 131H, TM application icon 131I, SMS application icon 131J, location module icon 131F, icon manager icon 131K and task manager icon 131L are shown. It will be appreciated that other presentation layouts for the icons can be used to impart other rankings of the applications.

Aspects of the above noted functions of an embodiment are managed by icon manager 130K, which provides: routines to manage the input of parameters to define new layouts; routines to periodically evaluate the activity of relevant applications having icons displayed on main screen 66; and routines to redefine the icon layouts using the activity data and the parameters provided to define new screen layouts. Operation of these routines is described below.

First, icon manager 130K provides a series of filters providing the user with a GUI on device 10 to define parameters as to how and when to automatically re-arrange icons on main screen 66. In particular, the filters provide fields to define trigger parameters to identify a triggering event to cause the icons to be re-arranged. The filter also provides layout parameters to identify how the icons are to be re-arranged. The templates for the filters and the parameters set by the user may be stored in flash memory 116. A filter may have a default display arrangement (e.g. alphabetic by names of applications). Also, a filter may be selectively activated and deactivated and even remotely toggled by predefined events. Further detail is provided on three exemplary filters.

For the first filter, GUI filter A allows the user to select a display of one icon ranking method which is done automatically at periodic intervals.

| Filter A |  |
|---|---|
| How do you want the appearance of the messaging icons to appear? (check appropriate box). The icons will be refreshed every period. | |
| First, choose a display selection | |
| 1. Do you want to show Large Icons with Text? | |
| 2. Do you want to show Large Icons without Text? | X |
| 3. Do you want to show Small Icons with Text? | |
| 4. Do you want to show Small Icons without Text? | |
| 5. Do you want to show text only for applications | |
| Now, choose a ranking method: | |
| Rank and show the icons for the applications in order of the amount of message traffic each application has been received since time from top to bottom | |
| Rank and show the icons for the applications in order of the amount of message traffic each application has been received since time from bottom to top. | |
| Scale the size of the icons for the applications relative to the amount of message traffic each application has received since time. | X |
| Flash the background of the icon of the application having the most message traffic received since time. | |
| "Fade" the icons of all applications except the icon of the application having the most message traffic received since time by making the icons appear to be N % opaque or, equivalently, (100 − N) % transparent. | |
| "Decolourize" the icons of all applications except the icon of the application having the most message traffic received since time. | |
| [other additional ranking methods can be provided] | ... |
| ... | |
| Visually emphasize the application having the most message traffic of all applications by changing the colour of the icon/text | |
| Visually emphasize the application having the most message traffic of all applications by changing the size of the icon/text | |

The filter has two sections. The first section allows the user to choose how he wants the icons (in a broad sense) displayed. The second section allows the user to choose how he wants to rank the icons of the applications. For the first section, an "X" has been entered in the second choice (large icons only) and for the second section, an "X" has been entered to select the third ranking system. The "period" and "time" parameters (noted in bold and underline) are entered by the user. They allow the user to identify how often the icons are re-arranged and to identify how far back the activity logs will be searched (i.e. to identify a particular time before which any older records are not considered). In other GUIs the sections may be provided separately.

The fade effect may be achieved by giving each pixel of the icons a new colour whose RGB values are the sum of N % of the RGB values of the original colour and (100−N) % of the RGB values of the colour of the homepage background colour. Initially, the preferred value of N is 50. The user may or may not have control over the value of N.

The decolourize effect may be achieved by desaturating the colour of each pixel in the icons, i.e., changing each colour to a shade of grey having an apparent brightness equal to that of the original colour. Alternatively, a partial desaturation may be achieved by changing each colour so that its RGB values are the sum of N % of the RGB values of the original colour and (100−N) % of the RGB values of the respective shade of grey, for some fixed value N. The user may or may not have control over the value of N.

For the second filter, filter B allows the user to select one icon ranking method which is done automatically when device 10 is at a pre-defined location.

| Filter B |  |
|---|---|
| When you are at location, how do you want the appearance of the messaging icons to appear? (check appropriate box) | |
| Show the telephone icon first, then rank and show the remaining icons for the applications in order of the amount of message traffic each application has been received since time from top to bottom | X |
| Show the email icon first, then rank and show the icons for the remaining applications in order of the amount of message traffic each application has been received since time from top to bottom. | |
| Show the application icon first, then rank and show the icons for the remaining applications in order of the amount of message traffic each application has been received since time from top to bottom. | |
| Scale the size of the icons for the applications relative to the amount of message traffic each application has been received since time. | |
| ... | ... |
| Visually emphasize the application having the most message traffic of all applications | |

The "X" has been entered by the user (e.g. using the keypad 24 and/or thumbwheel 20 to navigate through the filter and to make a selection) into the filter to select the first ranking system. The "location", "time" and "application" parameters are entered into the form by the user (as noted by the bold and underlined text). They allow the user to identify when the icons are re-arranged, to identify a particular timestamp from which any older records are not considered and to identify any "high priority" icons which should be shown first regardless of activity.

For the third filter, filter C allows the user to select one icon ranking method which is done automatically when device 10 is at a pre-defined time range.

| Filter C |  |
|---|---|
| Between the times of start time and end time, how do you want the appearance of the messaging icons to appear? (check appropriate box) | |
| Show the telephone icon first, then rank and show the remaining icons for the applications in order of the amount of message traffic that each application has received since time from top to bottom | |
| Show the email icon first, then rank and show the icons for the remaining applications in order of the amount of message traffic each application has received since time from top to bottom. | X |
| Scale the size of the icons for the applications relative to the amount of message traffic each application has received since time. | |
| ... | ... |
| Visually emphasize the application having the most message traffic of all applications | |

The "start time", "end time" and "time" parameters are entered into the form by the user (as noted by the bold and underlined text). They allow the user to identify a specific time period when the icons are re-arranged and to identify a particular timestamp from which any older records are not considered. Operational data for the monitor are stored in memory 116.

It will be appreciated that additional different ranking choices in other filters can be provided. For example, a GUI may be presented that provides general choices for organizing icons, such as in Filter D.

---
Filter D
Choose how you would like to have your applications arranged (check appropriate box):

Arrange applications by order of use.
Arrange applications in a certain order when I am at home.    X
Arrange applications in a certain order when I am at the office
...                                                          ...
Arrange applications in a certain order when the device is detected to be near other devices.

---

Sub filters can be provided once a selection is entered, allowing the user to define specific parameters (e.g. time, location, orders of applications) for the selected ranking choice.

The embodiment also allows selectable sub-constraints to be imposed on the ordering of the icons. For example, the icons may be arranged such that an email icon is displayed in a specific location (e.g. the email icon 130G is always displayed first or the location module 130F is always displayed last), regardless of its amount of use. The remaining icons can then be set to be ordered in a manner selected by the user.

Once a filter is selected, completed and saved, icon manager 130K extracts the parameters from the filter and establishes a monitor to detect the triggering event. For example, if the trigger is time-based, then the monitor may periodically monitor the clock signal. Upon a match of the clock signal against the trigger, the monitor notifies icon manager of the activation of the trigger. The application may allow state associations of times detected by the device with events at particular times of day. For example, a certain time range may be associated with being "at home", "at work" or "commuting". A similar monitor may be put in place for a location-based trigger. As such, if the embodiment can allow a filter to set different icon arrangement options, depending on the current associated state of the user. For example, if the user is "at home", then one particular ordering of icons may be set and if the user is "at work", then another ordering of icons may be set. Similarly, a filter may provide a particular ordering of icons when location module 130F detects that the device 10 is at geographic coordinates which are associated with the users "home".

Once the triggering event is detected, the activity logs of the relevant applications 130 are reviewed to rank the applications in order of activity. Prior to any reorganization of the order of the icons, the embodiment may provide prompt the user to confirm that he wishes to have the order re-organized. For example, the following Text Message A, below, may be generated on display 14 by icon manager 130K at the appropriate time:

---
Text Message A
* Your icon manager suggests that the order of your applications be changed. These changes will better reflect your usage patterns. Please select the appropriate action:

Yes: Please change the order of my icons now
No: Leave the order as it is

---

-continued

---
Text Message A
* Your icon manager suggests that the order of your applications be changed. These changes will better reflect your usage patterns. Please select the appropriate action:

Show me the details . . .
Remind me again later

---

After the relevant applications 130 are ranked, if the user affirms the re-organization of the icons on main screen 66, they are re-arranged according to any relevant layout parameters. In other embodiments, the confirmation step may be omitted.

Figure 4:
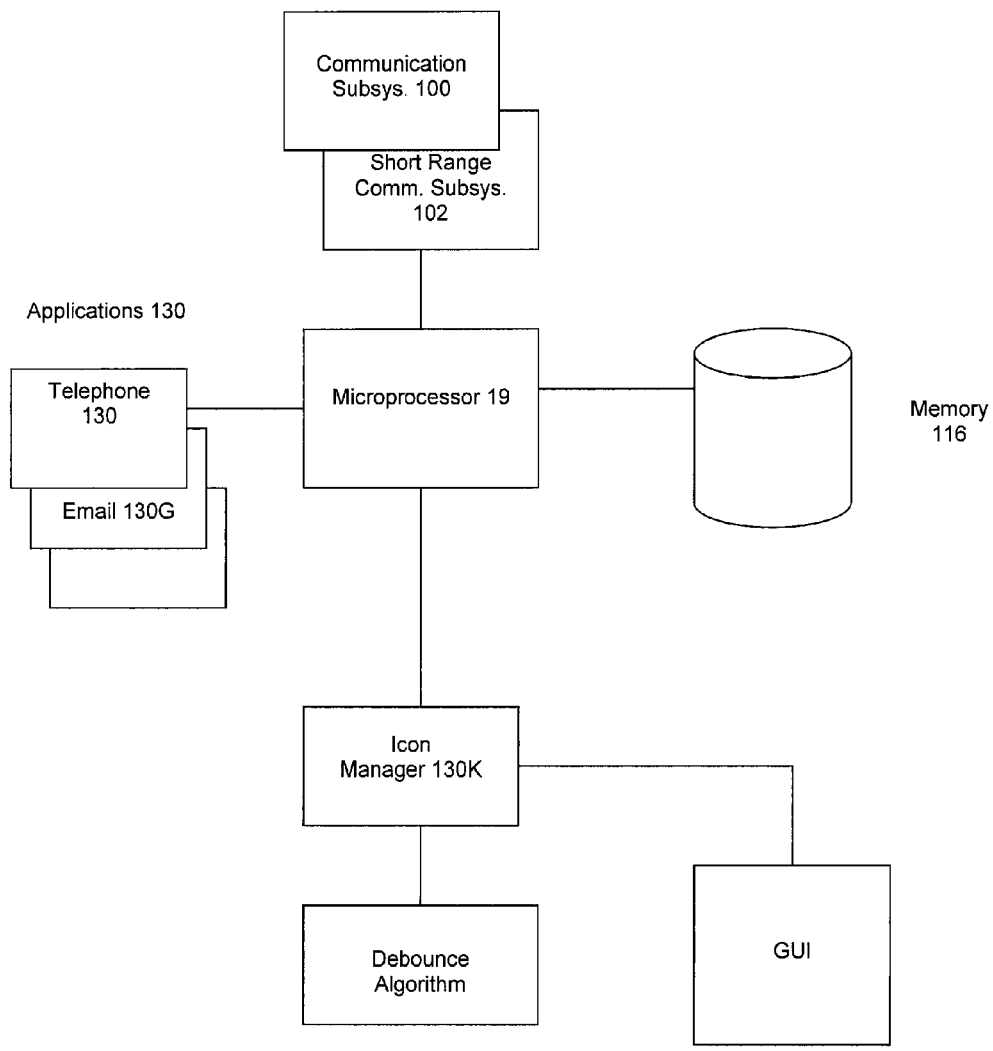
FIG. 4 is a block diagram showing relationships among received communications, applications, databases and internal components of an embodiment of FIGS. 1 and 2.
Figure 5:
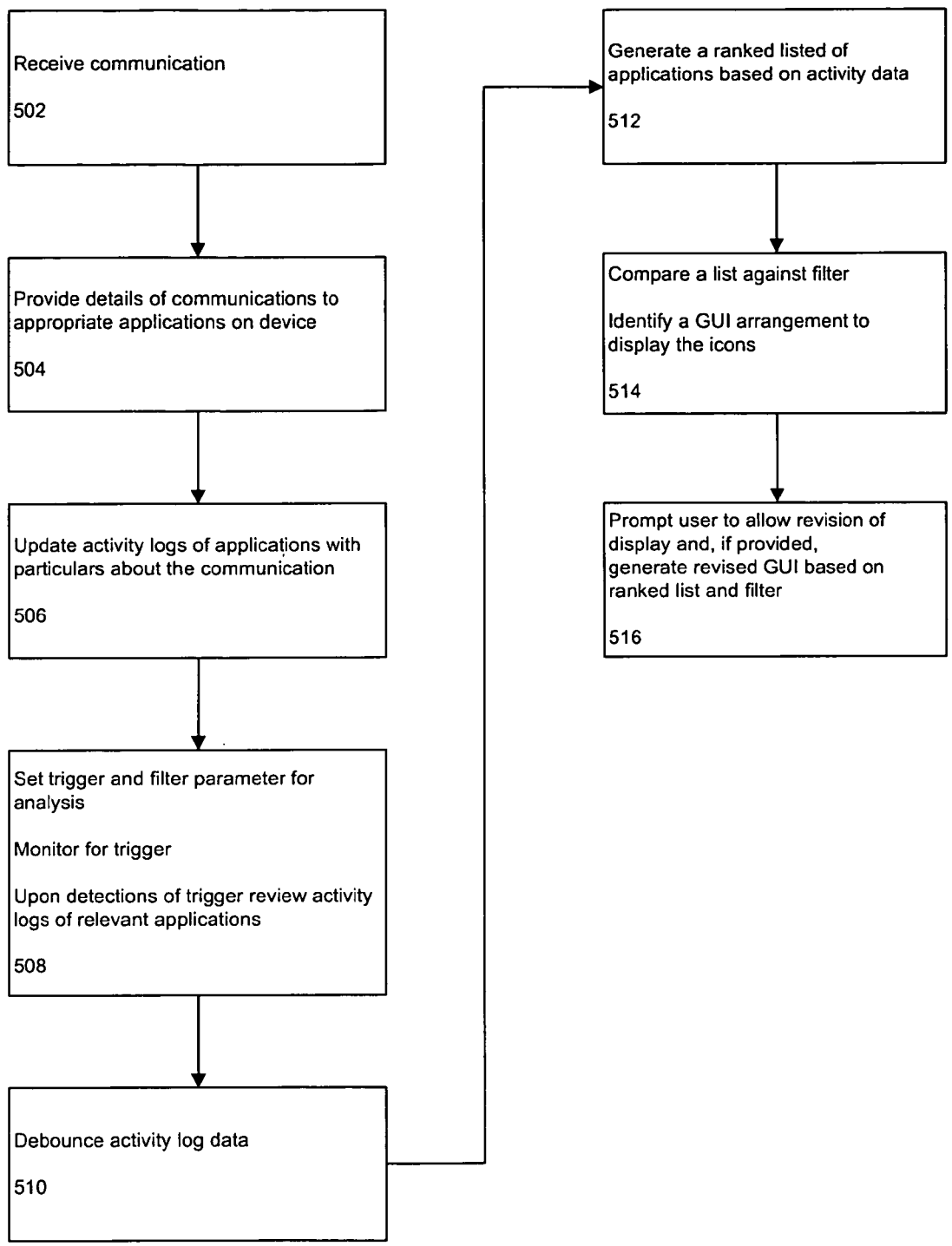
FIG. 5 is a flow chart of basic steps performed in processing prioritization of icons displayed on an embodiment of FIGS. 1 and 2.

Further detail is now provided on the general operation of icon manager 130K. In particular, referring to FIGS. 4 and 5, aspects of relationships between components, applications 130, GUIs generated for main screen 66 and icon manager 130K are shown. FIG. 4 shows how data can be processed amongst the noted components and FIG. 5 illustrates a general flow in processing the data to generate customized ranked icon displays for main screen 66.

Whenever a message is received or sent by either communication subsystem 100 or short range subsystem 102, it is initially processed by software operating on microprocessor 19. When the format of the received communication is determined, data relating to the communication is processed by the appropriate application 130. Activity log data for the communication is processed by the application and the related data is stored in memory 116. See steps 502, 504 and 506 in FIG. 5. The data is accessible by the application and other applications.

Next, once filter parameters for the rankings of applications has been set, when a triggering event is detected by icon manager 130K, it accesses the activity logs stored in memory 116 of the message/event processing applications 130. See step 508 in FIG. 5.

After the data in activity log for each relevant application 130 is retrieved, the data is "debounced", in debounce module 160. See step 510 in FIG. 5. Debouncing involves filtering from the data in the activity logs to remove "spurious", extraneous entries from further analysis. For example, a debounce filter may be set to disregard records relating to communications received from identified unwanted sources, e.g. emails sent from a fax server or telephone messages received from "416-555-1212". Other debounce filters can be used, based on time of received communications, source of received communications, etc.

Once the data from the activity logs are debounced, the debounced data are then analyzed to rank relevant applications 130 according to their amount of received communications. See step 512 in FIG. 5. The ranking is compared against any pre-set priority arrangements defined in the filter and then a final ranking is determined. Next, the user is prompted as to whether he/she wishes to revise the ordering of the icons. If he/she affirms the revision, icon manager 130K generates a revised ranked list of applications and generates a new main screen 66. See steps 514 and 516. The prompt provided to the user may or may not be provided.

As noted above, in step 516, the final results of the ranking are displayed on main screen 66. The embodiment provides several icon presentation formats. Selection and implementation of the formats is provided by icon manager 130K. Four exemplary presentation format are described below. For each example, it is presumed that the email application 130G has had the most communication activity.

Figure 6A:
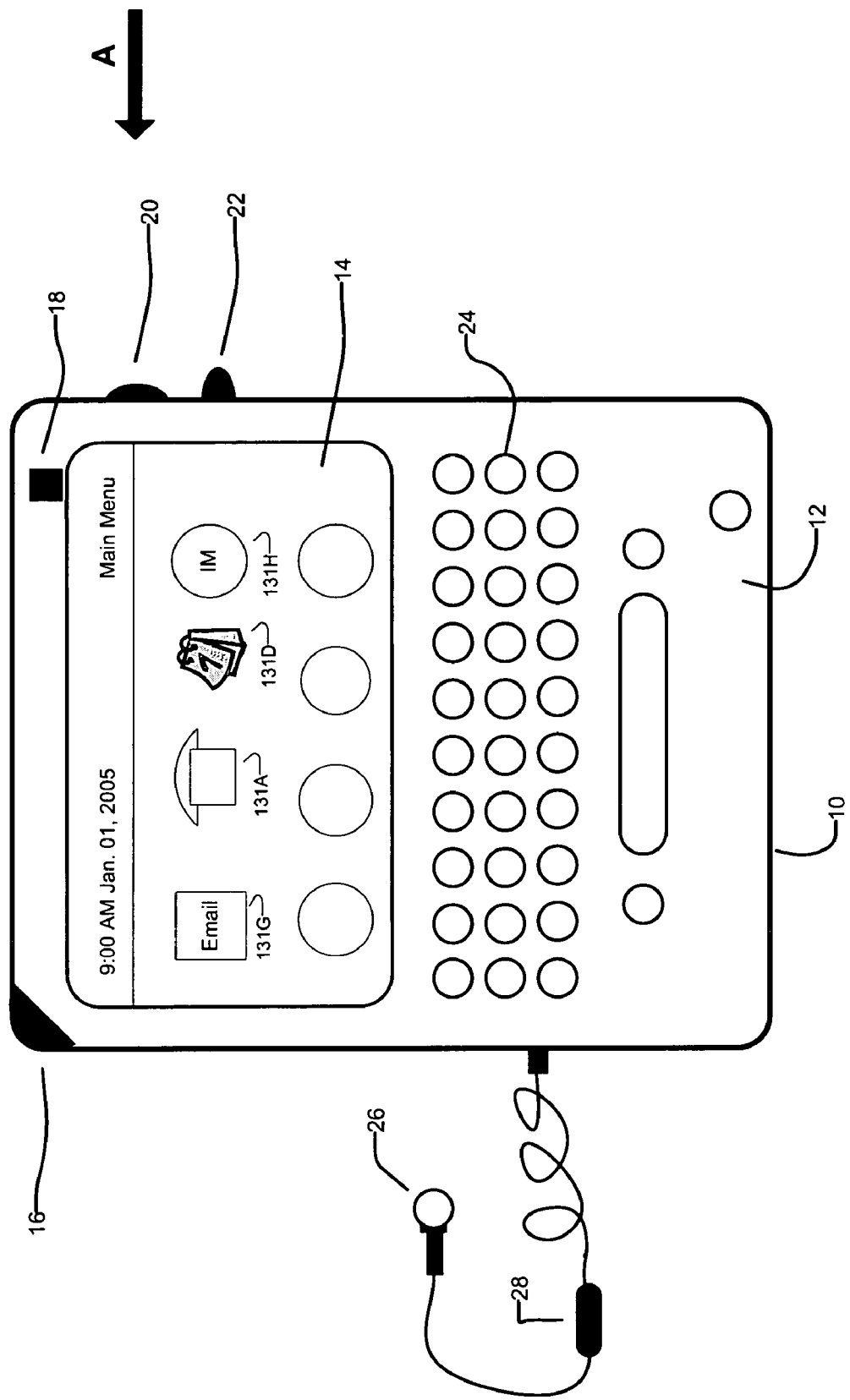
FIG. 6A is a schematic representation of the device of FIG. 1 showing on its display one arrangement of icons produced after the execution of the flow chart of FIG. 5.

First, FIG. 6A illustrates the results of one presentation format has already been mentioned, where the icon 131G for email application 130G is shown at in the top left corner of main screen 66, as it has been determined to be application having the most communication activity thereon. Remaining icons are shown but not labeled. They may be presented in an order which reflects the respective amount of activity for their associated applications.

Figure 6B:
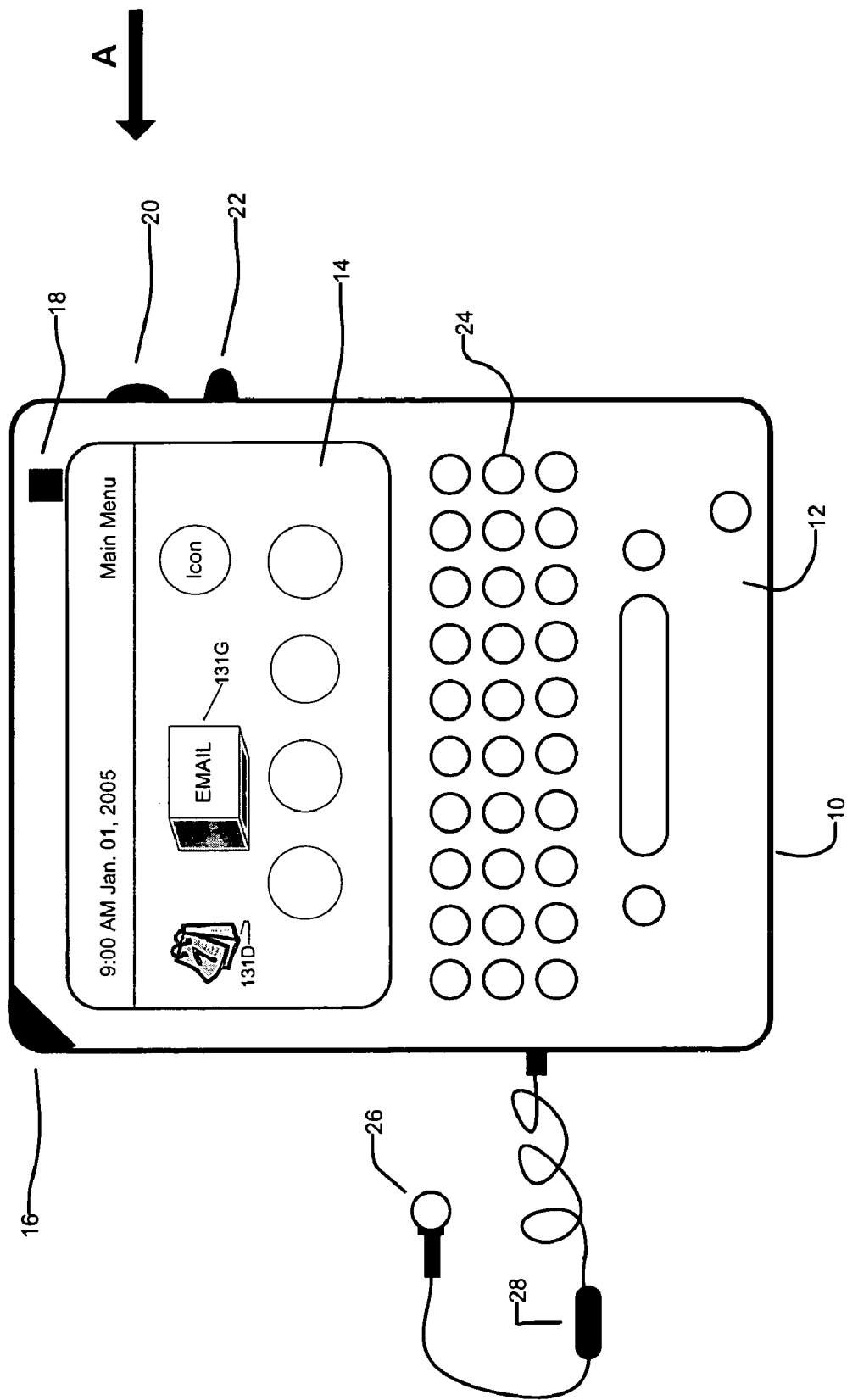
FIG. 6B is a schematic representation of the device of FIG. 1 showing on its display another arrangement of icons produced after the execution of the flow chart of FIG. 5.

Second, FIG. 6B illustrates the results of another presentation format, where icon 131G for email application 130G is shown as an emphasized icon, by having its size enlarged relative to the other icons. Further emphasis can be provided by changing colours of the foreground or background features of the icon or its related text. Remaining icons are shown but not labelled. They may be presented in an order which reflects the respective amount of activity for their associated applications. The visual appearance of the remaining icons may be de-emphasized by decolourizing (as described earlier in Filter A) their foreground and/or background colours.

Figure 6C:
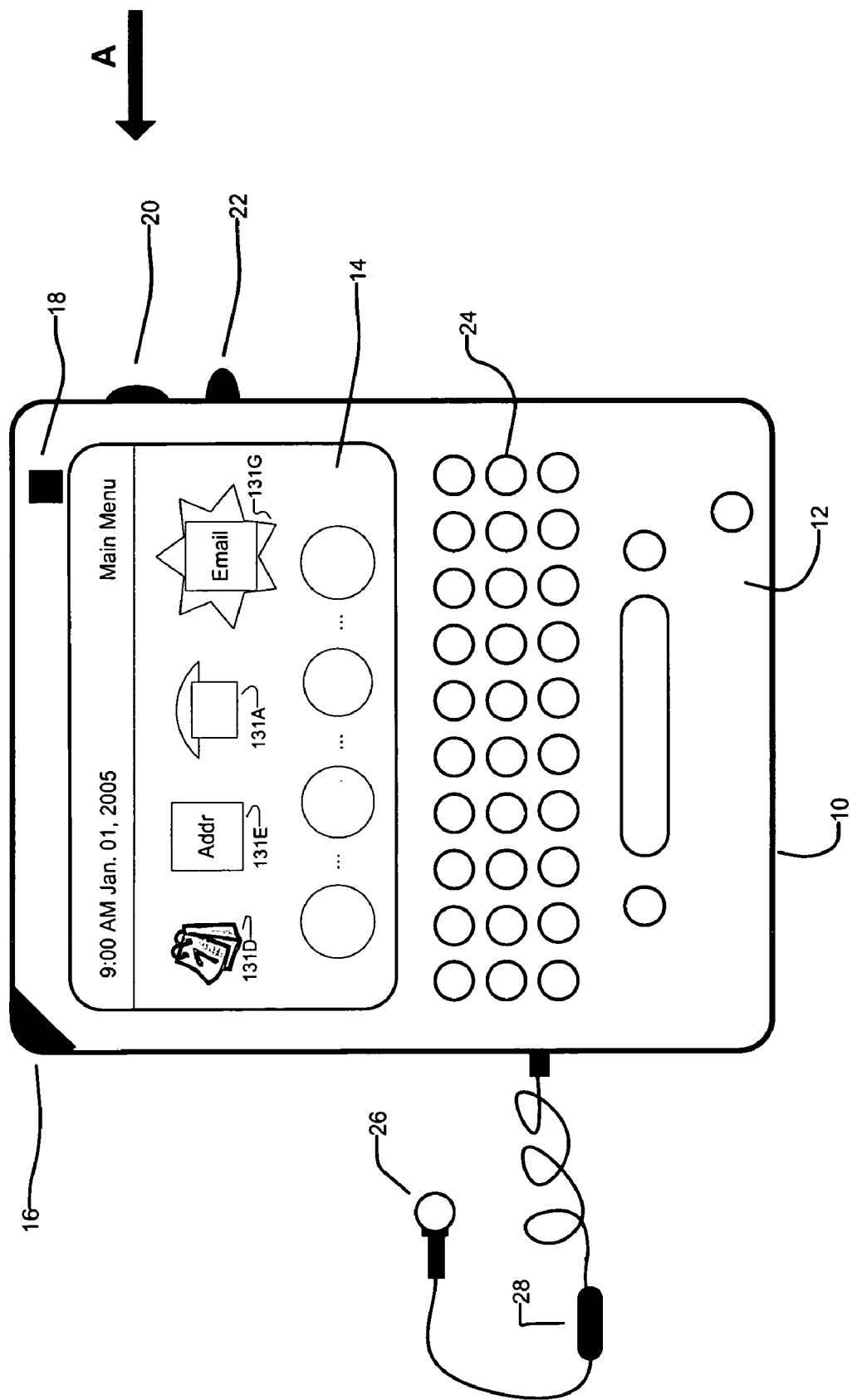
FIG. 6C is a schematic representation of the device of FIG. 1 showing on its display yet another arrangement of icons produced after the execution of the flow chart of FIG. 5.

Third, FIG. 6C illustrates the results of yet another presentation format, where the icon 131G for email application 130G is emphasized by enhancing aspects of its background elements (e.g. a flashing back cursor, or a change in colour for its immediate background) and/or enhancing aspects of its foreground elements (e.g. flashing main icon). Remaining icons are shown but not labelled. They may be presented in an order which reflects the respective amount of activity for their associated applications.

Fourth, FIG. 6D illustrates the results of yet another presentation format, where the applications are represented by only their associated text descriptions. The text descriptions are ordered in order of the ranking determined by the embodiment. The text description for email application 130G is "Message" and it is emphasized in a larger font in bold as compared to the text descriptions of other applications. Further enhancements may be provided by changing colour and appearance aspects of various text descriptions. For example, text descriptions of frequently used applications may be shown in bold and the background and or the foreground colour of text descriptions of selected applications may be changed. Fonts, colours and appearances may be changed to either enhance or de-emphasize a text description of an application as appropriate, based on its related activity level.

It will be appreciated that the icon manager and other applications in the embodiments can be implemented using known programming techniques, languages and algorithms. Data storage, access and update algorithms allow data to be shared between applications (e.g. between email application 130G and icon manager 130K). Signals can be generated, sent, received and responded to between modules using known programming techniques. Known programming algorithms can be used to process data relating to received communications against stored response criteria and availability conditions to identify an appropriate response.

Although the above noted embodiments relate to re-arranging icons 131 on main screen 66 for applications 130, it will be appreciated that in other embodiments, icons for different applications can be reconfigured for different display screens.

Also, although the above noted embodiments relate to ranking communication activities of relevant applications 130, it will be appreciated that other embodiments can rank other activities of other applications, folders and files processed by device 10.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. A method of dynamically refreshing presentation of icons for different applications for generation on a display of a mobile communication electronic device, said icons including a first icon for a telephone application operating on said device and a second icon for an email application operating on said device, the method comprising:
   providing a first template for a layout of said icons having a first trigger condition based on a time condition for said device, said layout of said icons including a fixed icon layout where one icon of said icons is automatically placed in a prominent location on said display and other icons are placed in ranked order in said display according to their respective activity levels;
   providing a second template for said layout of said icons having a second trigger condition based on a location condition for said device;
   providing a third template for said layout of said icons having a third trigger condition based on a periodic interval of time for said device;
   automatically refreshing said layout of said icons to highlight an icon associated with a more frequently used communication technology using one of said first, second or third templates when one of said first, second or third trigger conditions is detected by said device, otherwise automatically refreshing said layout of said icons to highlight an icon associated with said more frequently used communication technology;
   providing a graphical user interface (GUI) to list options for said first, second or third triggering conditions and options for said layout of said icons, said GUI including an interface to allow for entry of a selection of a format for said layout of said icons and to allow for entry for a parameter for said first, second or third trigger conditions; and
   providing in said GUI an interface to allow entry of a selection of a format for said layout of icons and to allow for entry for a parameter for a triggering event for said format.

2. The method of dynamically refreshing presentation of icons as claimed in claim 1, wherein said more frequently used communication technology is determined by analyzing at least a first activity log associated with said telephone application and a second activity log associated with said email application and utilizing a subset of data in said first and second activity logs filtered to exclude entries older than a certain timestamp.

3. The method of dynamically refreshing presentation of icons as claimed in claim 1, wherein said refreshing said layout of said icons involves placing said icon in said prominent location on said display and placing a set of icons associated with a set of next most frequently used applications from said applications in next most prominent locations on said display.

4. The method of dynamically refreshing presentation of icons as claimed in claim 1, wherein said refreshing said layout of said icons involves emphasizing visual aspects of said icon over other icons shown on said display.

5. A communication device comprising:
   a display;
   a communication system to transmit and receive telephone calls and email transmissions for said device;

a telephone application to process said telephone calls using said communication system and to track activity relating to said telephone calls in a first activity log;

an email application to process said email transmissions using said communication system and to track activity relating to said email transmissions in a second activity log;

a memory device to store and update said first and second activity logs;

an icon manager application for
- generating a layout of icons in a graphical user interface (GUI) on said display, said icons including a first icon for said telephone application and a second icon for said email application on said display, said layout of said icons including a fixed icon layout where one icon of said icons is automatically placed in a prominent location on said display and other icons are placed in ranked order in said display according to their respective activity levels;
- tracking time and location trigger parameters for refreshing said layout;
- providing a first template for said layout of said icons having a first trigger condition based on at least a time condition for said device;
- providing a second template for said layout of said icons having a second trigger condition based on at least a location condition for said device;
- providing a third template for said layout of said icons having a third trigger condition based on a periodic interval of time for said device;
- analyzing said first and second activity logs to identify a more frequently used communication technology between said telephone and email applications from said ranking;
- automatically refreshing said layout of said icons to highlight an icon associated with a more frequently used communication technology using one of said first, second or third templates when one of said first, second or third trigger conditions is detected by said device otherwise automatically refreshing said layout of said of icons to highlight an icon associated with said more frequently used communication technology; and
- providing in said GUI an interface to allow entry of a selection of a format for said layout of icons and to allow for entry for a parameter for a triggering event for said format.

6. The communication device as claimed in claim 5, wherein said icon manager application utilizes a subset of data in said first and second activity logs to identify said more frequently used communication technology, said subset of data filtered to exclude records older than a certain timestamp.

7. The communication device as claimed in claim 5, wherein said layout of said icons is refreshed to place said icon in said prominent location on said display and to place a set icons associated with a set of next most frequently used communication technologies from said communication technologies in next most prominent locations on said display.

8. The communication device as claimed in claim 5, wherein said layout of said icons is refreshed to emphasize visual aspects of said icon over other icons shown on said display.

9. The communication device as claimed in claim 5, wherein said fixed icon layout is set through said GUI to be active for at least one of an adjustable, specific time range and when said device is at a specific location.

10. The communication device as claimed in claim 5, wherein said icon manager application generates a confirmation notice on said display prior to refreshing said layout.

11. The method of dynamically refreshing presentation of icons as claimed in claim 1, wherein said icon manager application generates a confirmation notice on said display prior to refreshing said layout.

12. The communication device as claimed in claim 5, wherein said icon manager application removes icons of the least used applications from the display and provides access to same through a menu option.

13. The communication device as claimed in claim 5, wherein:
- said first template provides another trigger condition based on a location condition; and
- said icon manager application uses said another trigger condition in determining when to refresh said layout of icons.

14. The communication device as claimed in claim 5, wherein said icon manager application refreshes said layout by placing one of said first or second icons in a predetermined location in said display regardless of usage data.

15. The communication device as claimed in claim 5, wherein said first template generates in said GUI a first set of choices for presentation of said icons and a second set of choices for said first trigger condition.

16. The communication device as claimed in claim 14, wherein said icon manager application places remaining icons in said layout in a ranked order in said display according to their respective activity levels.

17. The communication device as claimed in claim 5, wherein said GUI provides an interface to allow selection of a size of icon for said layout of said icons and a further interface to allow entry of a ranking method for said layout of said icons.

18. The communication device as claimed in claim 5, wherein said GUI provides a fourth template for said layout of said icons having a fourth trigger condition based on a state condition, said state condition including an "at work" state for a user of said device.

* * * * *